Figure 1:
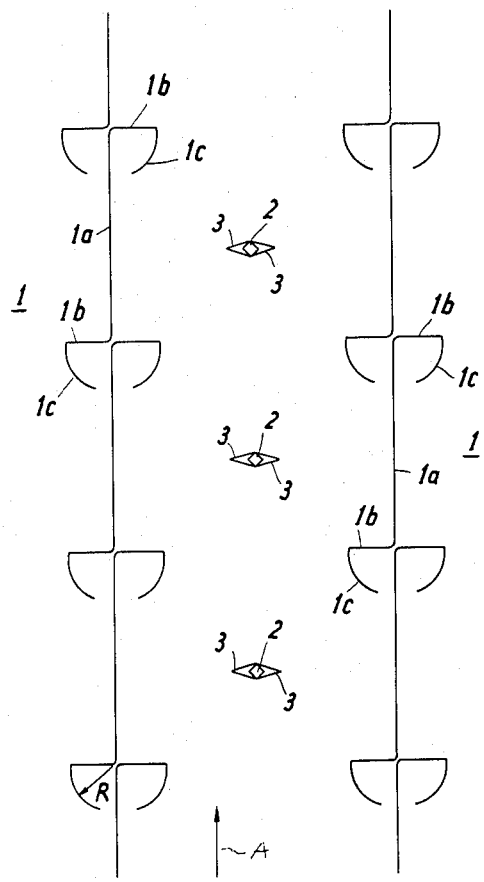

Aug. 3, 1965   D. ERTL ETAL   3,197,943
PRECIPITATING ELECTRODES FOR ELECTRIC FILTERS
Filed March 20, 1961   2 Sheets-Sheet 1

Inventor:
Dietrich Ertl
Walter Steuernagel
by Bailey, Stephens & Huettig
Attorneys 3,197,943
PRECIPITATING ELECTRODES FOR ELECTRIC FILTERS
Dietrich Ertl, Konigstein, Taunus, and Walter Steuernagel, Frankfurt am Main, Germany, assignors to Metallgesellschaft Aktiengesellschaft, Frankfurt am Main, Germany
Filed Mar. 20, 1961, Ser. No. 96,905
Claims priority, application Germany, Apr. 20, 1960, M 45,048
2 Claims. (Cl. 55—154)

This invention relates to electric filters and, in particular, is directed to a precipitating electrode for such filters.

German Patent No. 471,795 discloses flat precipitating electrode plates having vertically positioned dust collecting gutters in the form of staggered and spirally coiled collecting pockets which are open toward the flow of gas through the precipitator so that the gas being cleaned will force the precipitated dust into the collecting pockets. However, in actual use, it has been found that the cleaning of such large electrode walls with the collecting pockets is difficult when rapping or otherwise jarring the electrodes to free them of dust. Also, it has been found to be very expensive to manufacture and assemble the parts of such electrodes and to transport such electrodes, especially in view of such costs with the overall cost of the filter installation.

Because of such difficulties, it has been found advisable to divide these precipitating electrodes into separate strips.

The object of this invention is to produce a particularly advantageous manner of forming the precipitating electrodes for electric filters, and preferably in filters through which the gas flows horizontally and the precipitating electrodes are arranged as a plurality of vertically positioned uniform strip elements arranged in rows. These strip elements have their vertical longitudinal edges provided with alternate vertically extending dust collecting pockets which form regions of low gas velocity so that the dust will settle out of the gas. According to this invention, flanges are bent at right angles to the body of the strip elements, and these flanges have a length approximately half of the remaining body portion of the strip element. The outer half portion of each flange is then re-bent as a curve directed toward the plane of the body of the strip element in order to form a pocket having the shape of a claw and having a fixed radius.

The advantage of the electrode strip element of this invention is in that it can be fabricated comparatively cheaply by cold bending a flat strip. Consequently, when the formed strips are arranged adjacent each other in a row, flat surfaces are provided which possess good electrical and aerodynamical qualities for the precipitation of dust thereon and are furthermore provided with dust collecting pockets on each side of the plane of the body of each strip element. These dust collection pockets of this invention by being formed during the fabrication of the strip element save an additional working day in the fabrication of the strip element in that the pockets do not have to be either clamped, riveted, or welded on the body of the strip element.

According to another feature of this invention, the precipitating electrode strip elements in opposed parallel rows of elements to form parallel gas channels are staggered with respect to each other so that a portion of the metal in the strip element which has, up to now, only been used for collecting pockets is now used also as a dust precipitating area. Thus, without reducing the designed precipitating area, it is now possible to obtain a material savings of about 12%.

The electrical qualities of the precipitating electrodes of this invention are used advantageously without a loss of the precipitating dust into the stream of flowing gas, as compared to the alternately staggered dust collecting areas of the electrode shown, for example, in French Patent No. 1,144,434, columns 1, 3 and 5, and FIGURE 3, and also shown in German Patent No. 478,377, because the arrangement of this invention permits an effective electrical field of precipitation to be formed on both sides of the strip elements, even with the use of diamond shaped ionizing wires.

Figure 2:
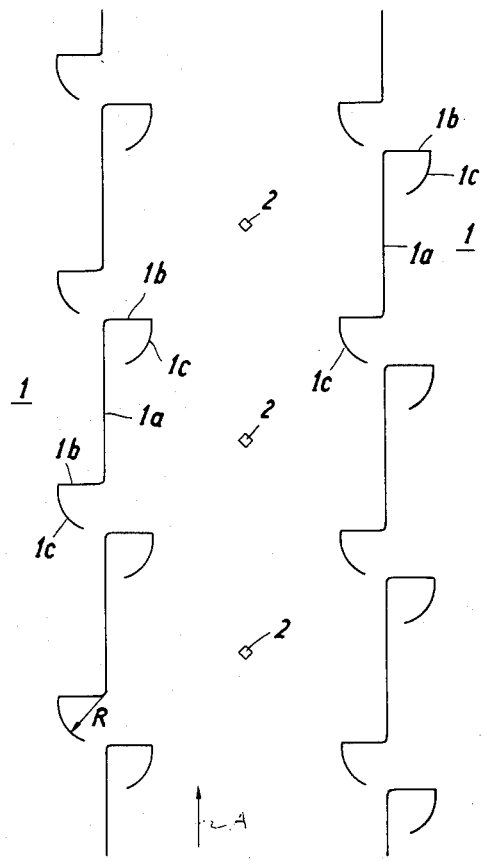

The means by which the objects of the invention are obtained are disclosed more fully with reference to the accompanying schematic drawings, in which:

FIGURE 1 is a plan view of the separate strip element electrodes arranged in two parallel rows to form a gas channel therebetween; and FIGURE 2 is a modification of the structure of FIGURE 1 in which the electrodes in one row are staggered with respect to the electrodes in an adjacent row.

As shown in FIGURE 1, each row of electrodes is composed of individual cold form strip elements 1. The body portion 1a of each strip element lies in a flat plane. Each vertical edge portion is bent out at right angles to the body portion 1a and has a length of approximately one-half the width of body portion 1a. The innermost flange portion 1b is straight and the outermost portion 1c of the flange is re-bent in the form of a curve having a radius R with its free end directed toward the plane of body portion 1a in order to form a curved claw-shaped dust collecting pocket which is open toward the direction of gas flow as shown by the arrow A. The ionizing wires 2 are placed midway of the rows of electrode strip elements and are centered with respect to the centers of the body portions 1a. Instead of diamond-shaped wires alone, discharge points 3 can be mounted on the wires and alternated along the length of the wire. By so doing, according to this invention, the form of the strip elements can be selected in a correctly chosen relationship of the width of the channel between the rows of strip elements to give a channel distance which is divided by the width of the body portion 1a of each strip to make a ratio of 4:3 (for example, 240 mm. divided by 180 mm.) so that it is possible to form a semi-circle centered around the respective ionizing wires 2 with points 3 to form a higher concentration of the field energy on the actual precipitating area as contrasted to prior known strip elements which have only flat surfaces exposed to the ionizing wires.

It therefore follows that the dust precipitating effect is greatly increased. Even when the diamond- or star-shaped wires alone are used, it is possible to increase the field energy in this manner.

In FIGURE 1, the individual strip elements are arranged in rows so that the body portions 1a substantially abut one another in line. As shown in FIGURE 2, the individual strip elements in each row are spaced from each other by a distance R, and thus the body portions 1a of the strip elements in one row are staggered with respect to the corresponding strip elements in an adjacent row. The spacing distance R approximates the length of the radius R of the curved outer flange portion 1c.

Having now described the means by which the objects of the invention are obtained,

We claim:
1. In an electrical precipitator having a horizontal gas flow therethrough:
  (a) a plurality of spaced apart parallel rows of vertically extending uniform precipitating electrodes;
  (b) each row of electrodes including a plurality of separate strip elements, each element having,

(1) a flat planar body portion parallel to the direction of gas flow, said body portion having a vertically extending upstream edge and a vertically extending downstream edge, (2) a flange connected to and coextensive with each said edge with the flanges on opposite side edges extending in opposite directions from said body portion, each flange being about one half the width of the body portion and each of said flanges having an inner half portion extending outwardly from the body portion at a right angle thereto and an outer half portion extending in a curve directed toward and terminating short of the plane of the body portion and opposite to the direction of gas flow, whereby each flange forms with the body portion a dust collecting pocket open in the direction of gas flows;

(c) all of the body portions of the elements in a single row lying in the same plane with the inner half portions of the flanges of adjacent elements in the same and adjacent rows lying in the same plane;

(d) the spacing between the rows of electrodes being to the width of the body portion of an element in the ratio of 4:3.

2. In an electrical precipitator having a horizontal gas flow therethrough:

(a) a plurality of spaced apart parallel rows of vertically extending uniform precipitating electrodes;

(b) each row of electrodes including a plurality of separate strip elements, each element having, (1) a flat planar body portion parallel to the direction of gas flow, said body portion having a vertically extending upstream edge and a vertically extending downstream edge, (2) a flange connected to and coextensive with each said edge with the flanges on opposite side edges extending in opposite directions from said body portion, each flange being about one half the width of the body portion and each of said flanges having an inner half portion extending outwardly from the body portion at right angle thereto and an outer half portion extending in a curve directed toward and terminating short of the plane of the body portion and opposite to the direction of gas flow, whereby each flange forms a dust collecting pocket open in the direction of gas flow;

(c) all of the body portions of the elements in a single row lying in the same plane with the body portions of adjacent elements spaced from each other a distance substantially equal to the radius of the curved outer half portion of an element flange, the elements in each row being staggered with respect to the elements in an adjacent row by a distance substantially equal to the radius of the curved outer half portion of an element flange;

(d) the spacing between the rows of electrodes being to the width of the body portion of an element in the ratio of 4:3.

References Cited by the Examiner

UNITED STATES PATENTS

| | | | |
|---|---|---|---|
| 1,345,790 | 7/20 | Lodge | 55—130 |
| 1,791,338 | 2/31 | Wintermute | 55—128 X |
| 1,912,053 | 5/33 | Wintermute | 55— 130 |
| 2,815,824 | 12/57 | Armstrong et al. | 55—130 |
| 2,826,262 | 3/58 | Byerly | 55—130 |
| 2,903,089 | 9/59 | Latham | 55—130 X |
| 2,946,400 | 7/60 | Gustafsson. | |
| 3,008,541 | 11/61 | Wachter | 55—149 X |

FOREIGN PATENTS

| | | |
|---|---|---|
| 1,028,559 | 2/53 | France. |
| 1,144,434 | 4/57 | France. |
| 1,227,790 | 3/60 | France. |
| 422,619 | 12/25 | Germany. |
| 464,858 | 12/28 | Germany. |
| 471,795 | 2/29 | Germany. |
| 630,840 | 12/36 | Germany. |
| 687,837 | 2/53 | Great Britain. |
| 701,855 | 11/54 | Great Britain. |
| 805,720 | 12/58 | Great Britain. |

HARRY B. THORNTON, *Primary Examiner.*